April 22, 1958 — W. R. HAYNES — 2,831,452
FILLER PIPE WITH SOUND SIGNAL
Filed Jan. 7, 1957
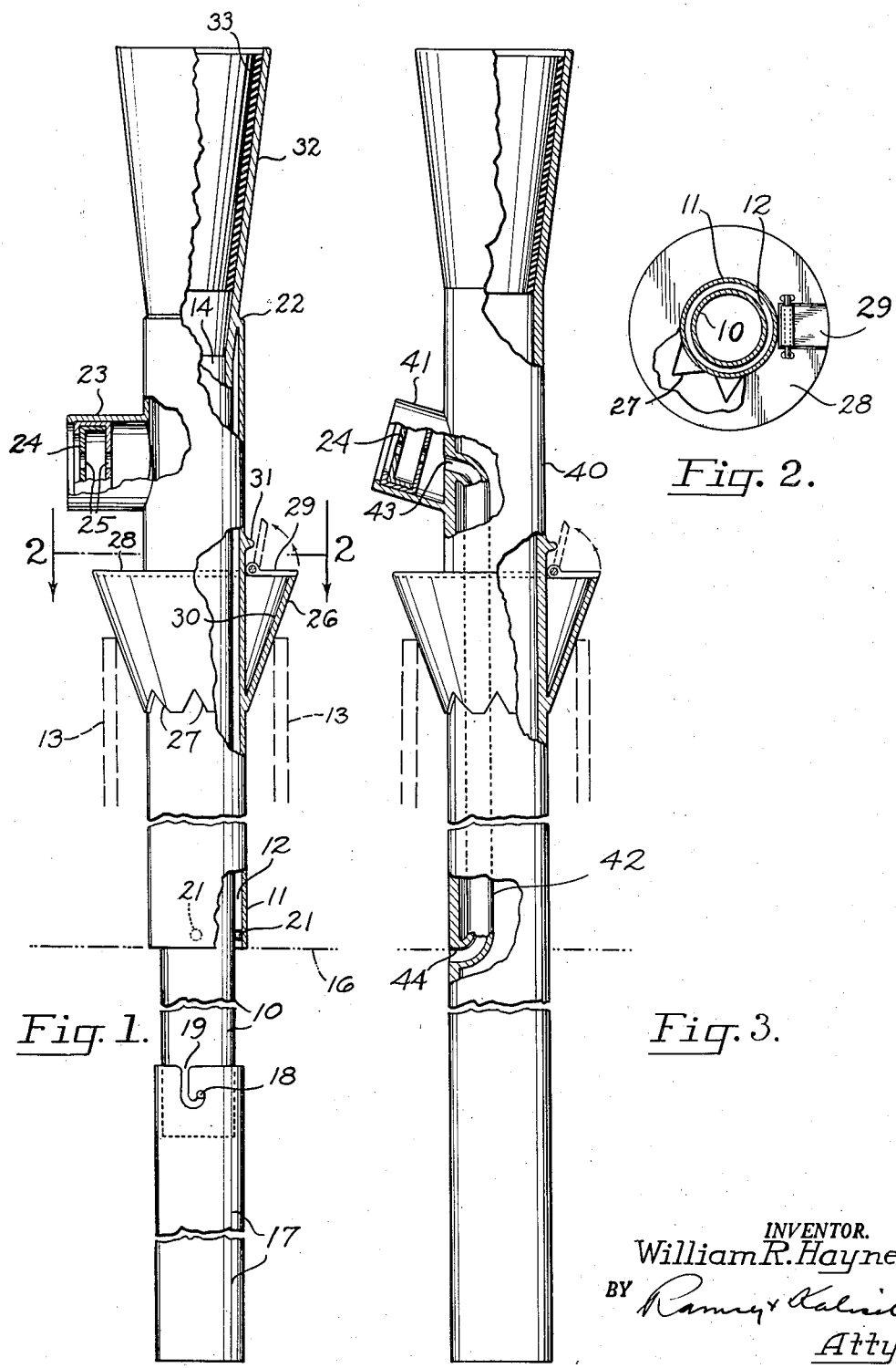
INVENTOR.
William R. Haynes

United States Patent Office 2,831,452
Patented Apr. 22, 1958

2,831,452

FILLER PIPE WITH SOUND SIGNAL

William R. Haynes, Portland, Oreg.

Application January 7, 1957, Serial No. 632,764

4 Claims. (Cl. 116—112)

This invention relates to signal devices for filling liquid tanks and, more particularly, to a filler pipe accessory having an audio signal means adapted to be placed in the filling duct of a tank and provide a warning when the level of liquid in the tank has reached a certain point.

Liquid tanks, such as domestic fuel tanks and the like, oftentimes are placed under the yard or garden of a house or sometimes in the basement of a house, so that a problem is created in adequately filling the tank without causing an overflow. If overflow does occur, damage to the house and/or surrounding lawns and shrubbery results creating a cleaning expense which is highly undesirable and usually must be accounted for by the agency filling the tank. Various signal devices have been proposed for warning the operator when the level in the tank has reached a suitable level. However, these have proved so unreliable that many prefer not to depend upon them.

Generally, it is an object of this invention to provide a filling pipe accessory to be used in filling tanks such as fuel tanks which will produce an audible signal arranged so that the operator is warned when the fluid has reached a certain level, yet which is completely reliable and can be used effectively with most ordinary fuel tanks.

Of the various signal devices employed for filling fuel tanks, some have used an aspirator tube leading in the direction of the flow of the fuel from the hose filling the tank wherein the fuel flow pulls atmospheric air through the tube. A whistle mechanism is included in the tube so that a sound is produced by this passage of air. The tube is placed with its lower end at the maximum level which the fuel is to obtain in the tank so that the whistle stops when the end of the tube is immersed in oil.

Devices of this nature depend upon the maintenance of atmospheric pressure in the tank. Air vent ducts are normally provided with fuel tanks which prevent build-up of pressure within the tank when the air vents are operating property. However, tanks with age tend to settle so that the lower end of the air vent duct protrudes into the fuel oil in the tank, preventing the escape of air. In other instances, particularly if the air vent duct is outside, the duct may become clogged either with dirt or other foreign matter such as insect nests. In either case, pressure build-up occurs which many times causes the fuel oil to spew out of the air vent duct with consequent damage to the surroundings.

Some devices have used whistle mechanisms which are installed within the air vent duct. However, these are impractical particularly with outside fuel tanks because of the plugging up mentioned hereinabove and because of the corrosion which occurs in the parts. Further, not all air vent ducts are so equipped so that an operator may not rely on such a system in all cases.

This invention contemplates a filler pipe which may be used as an accessory with the ordinary hose used for filling a tank, the filler pipe being so constructed and arranged that it may be readily positioned in the filling duct of a fuel tank. The filler pipe includes an audible whistle mechanism which depends upon the exhaust of air from the fuel tank and not upon the passage of air into the tank as by the aspirator tube of prior devices. In this manner, air pressure built up within the tank tends to be kept at a minimum level. Further, the filler pipe includes a relatively large exhaust passage means and a relief valve associated therewith accommodating the exhaust of air from the tank and constructed to accommodate relatively free discharge of air before the pressure within the tank reaches a dangerous level. The filler pipe also includes means for suitably plugging the end of the filling duct, insuring the passage of the requisite amount of air through the whistle mechanism. The relief valve provided enables the duct to be so plugged without danger providing, as it does, for the ready exhaust of air upon a dangerous pressure build-up in the tank.

It is, then, an object of this invention to provide a filler pipe for use with the filling duct of a liquid tank which has a passage connected to a whistle mechanism operable to sound an audio signal by the passage of air outwardly from the tank until the level of liquid in the tank reaches the requisite height and which also includes a relatively large exhaust conduit and valve mechanism insuring the ready exhaust of air upon a pressure build-up in the tank.

Another object is to provide such a filler pipe which has novel means for plugging the filler pipe in the filling duct of a tank so that the passage of air will, for the most part, take place through the whistle mechanism and the exhaust passage means.

Still further, it is an object to provide a filler pipe for liquid tanks which comprises concentric tubular sections so arranged that passages are presented for the discharge of liquid into the tank and the escape of air from the tank, the entire construction being simple, compact, and readily adapted for economical manufacture.

These and other objects and advantages are attained by the present invention and are described with reference to the accompanying drawings wherein:

Fig. 1 is a side view, partly broken away, of the filler pipe showing the pipe set up in the filling duct of a fuel tank;

Fig. 2 is a section view along the line 2—2 of Fig. 1, and

Fig. 3 is a side view, partly broken away, of a modified form of filler pipe.

Referring to Figs 1. and 2 of the drawings, an embodiment of the filler pipe comprises, generally, a pair of tubular pipe sections 10 and 11 arranged concentrically with respect to one another and spaced apart from each other so as to present an annular passage 12 between the exterior of the inner pipe section and the interior of the outer pipe section. In operation, the pipe sections are lowered into the filling duct of a fuel tank indicated at 13. A passage 14 running down through the interior of pipe section 10 accommodates the passage of fuel oil from the conventional fuel hose downwardly into the tank. Outer pipe section 11 is selected so that its lower end lies at the maximum level of fuel oil which is desired in the tank, indicated by line 16.

Inner pipe section 10 projects considerably further downwardly into the tank to prevent splashing of the fuel oil and to prevent the fuel oil from becoming entrained in the air passing upwardly in passage 12. In some instances, an auxiliary pipe section such as pipe section 17 may be fitted onto the end of the inner pipe section to effectively lengthen the pipe section. The auxiliary pipe section may be secured in place as by pin 18 fixed to the periphery of pipe section 10 and accommodating slot 19 formed in pipe section 17.

Inner pipe section 10 is held radially spaced from the interior of the outer pipe section at its lower end by a series of spot welds 21. The two pipe sections are sealed together at their upper ends as by welding at 22.

Affixed near the upper end of the outer pipe section is a pipe stub 23 with its interior in fluid communication with annular passage 12. Held at the outer end of pipe stub 23 and sealed at its edges to the pipe stub is a whistle 24 having a pair of orifices 25. Annular passage 12 and the orifices in the whistle are relatively small, and relatively minor amounts of air pass outwardly from the tank through this passage and whistle 24.

Intermediate the ends of the outer pipe section 11 and affixed to the pipe section is a frusto-conical stopper shield 26. Stopper 26 has its expanded end facing upwardly and contains a series of cutouts 27 around its lower edge where it is joined to pipe section 11. A plate 28 is placed about the top of stopper 26, sealing the upper end of the stopper to the exterior of pipe section 11. The inner surface of plate 28 and stopper 26 define a cavity 30 opened to the interior of filling duct 13 by cutouts 27.

Plate 28 is provided with a hinged door member 29. The weight of door member 29 is selected so that after a certain amount of pressure is built up within the tank, duct 13, and cavity 30, the door swings open about its pivot connection allowing the exhaust of air from within the tank and thus forms a pressure relief valve means preventing an excessive build-up within the fuel tank. A rib 31 is included in the periphery of outer tube section 11 to prevent the door member from swinging to an overcenter position with respect to its pivot connection so that that door member returns to its lowered position upon a decrease of pressure within the tank.

Cutouts 27, cavity 30, and hinged door 28 accommodate the passage of relatively large amounts of air from within the tank. By so proportioning the parts, unexpected blowout of fuel oil from the tank is effectively prevented. The inclined outer surface of stopper 26 comprise a means for sealing the space between the periphery of pipe section 11 and the interior of the filling duct for the fuel tank. The sides of the stopper are inclined to accommodate the various sizes of filling ducts which are normally encountered.

The upper end of inner tube section 10 carries a funnel portion 32. Disposed about the interior of the funnel portion is a plastic liner 33 preferably made of neoprene or other synthetic rubber. Funnel portion 32 and liner 33 are adapted to receive the end of a fuel hose nozzle and hold the same in a relatively stable condition, the liner deflecting somewhat under the pressure of inserting the nozzle.

Referring to Fig. 3, a modified form of filler pipe comprises a pipe section 40 having affixed to its upper end a pipe stub 41. A tube 42 extends from a lower portion of pipe section 40, which lies at the maximum level of fuel oil which is desired in the tank, to the upper end of pipe section 40 adjacent pipe stub 41. The tube is affixed to the interior of pipe section 40, and ports 43 and 44 are provided in the walls of pipe section 40 to accommodate the passage of air through tube 42 to the interior of pipe stub 41. Tube 42 is bent gradually at the points where it is connected to pipe section 40 in order to insure relatively free movement of air through the tube. Pipe stub 41 is set at an acute angle relative to pipe section 40 to further facilitate the passage of air from tube 42 through whistle 24 carried at the outer end of the pipe stub. The filler pipe includes a stopper shield intermediate the ends of tube 42 and funnel portion at the top of the filler pipe similar to the embodiment illustrated in Fig. 1.

In the embodiment of the invention just described, fuel oil is introduced into a tank through the interior of pipe section 40, and whistle 24 is operated by the exhaust of air through tube 42. Tanks may be filled at a fairly rapid rate since the cross-sectional area of the interior of pipe section 40 is considerably larger than the cross-sectional area occupied by tube 42.

The filler pipe of this invention comprises a simple but effective device useful for filling liquid tanks. The accessory, since it is carried by the person filling the tank, can be kept in good operating condition to insure that fuel spillage will not occur. Rather than by introducing air by an aspirator tube into the tank, the audio signal of this invention relies upon the exhaust of air from within a tank caused by the inflow of fluid into the tank. The device may be used with most fuel tanks, regardless of the condition of the tank or of the air vent duct normally associated therewith.

It takes a very slight amount of air to operate whistle 24, and in this manner door member 29 is constructed to swing upwardly after a very slight pressure build-up. If the air vent duct of a tank is such that no significant flow of air occurs through the whistle device, suitable means can be used for covering the vent to assure the flow of air upwardly through the filler pipe.

It is claimed and desired to secure by Letters Patent:

1. A filler pipe for indicating liquid level in tanks and adapted to be placed in the filling duct of a tank comprising a first conduit means projecting downwardly into the tank when positioned in the tank and having a lower inlet end adapted to be placed at the maximum liquid level desired in the tank, said first conduit means accommodating the passage of relatively minor amounts of air from within the tank and including whistle means producing sound on the passage of air through said conduit means, a second conduit means for discharging liquid into the tank, and relief conduit means including a relief valve accommodating the passage of relatively large amounts of air from within the tank upon a pressure build-up within the tank, said relief conduit means having an inlet end spaced a substantial distance above the inlet end of said first conduit means.

2. A filler pipe for indicating liquid level in tanks and adapted to be placed in the filling duct of a tank comprising a first conduit means projecting downwardly into the tank when positioned in the tank and having a lower inlet end adapted to be placed at the maximum liquid level desired in the tank, said first conduit means accommodating the passage of relatively minor amounts of air from within the tank and including whistle means producing sound on the passage of air through said conduit means, a second conduit means for discharging liquid into the tank, relief conduit means including a relief valve accommodating the passage of relatively large amounts of air from within the tank upon a pressure build-up within the tank, and means for mounting the filler pipe in the filling duct, said last mentioned means having a stopper portion adapted to detachably rest on the filling duct and seal the filling duct by supporting the weight of the filler pipe on the top of the filling duct, said stopper portion preventing the discharge of substantial amounts of air through the filling duct except through said first and relief conduit means.

3. A filler pipe for indicating liquid level in tanks and adapted to be placed in the filling duct of a tank comprising a pair of concentric inner and outer tubular sections, the interior of said inner tubular section defining means for discharging liquid into said tank, the interior of said outer tubular section and the exterior of said inner tubular section defining air passage means for the escape of air from within the tank, whistle means connected to said air passage means producing sound on the flow of air through said air passage means, and a frusto-conical member encircling said outer tubular section a substantial distance above the lower end of said outer tubular section and providing a seal between the periphery of said filler pipe and the filling duct, said member containing relief conduit means and a relief valve accommodating the passage of relatively large amounts of air from within the tank upon a pressure build-up within the tank, said frusto-conical member providing a seal by supporting the weight of the filler pipe on the top end of the filling duct.

4. A filler pipe for indicating liquid level in tanks and adapted to be placed in the filling duct of a tank comprising an elongated pipe section, air conduit means extending longitudinally along the interior of said pipe section and having its ends opened to the exterior of said pipe section, whistle means connected to said air conduit means producing sound on the passage of air through said conduit means, and a frusto-conical member encircling said pipe section intermediate the ends of said air conduit means adapted to provide a seal between the periphery of said pipe section and a filling duct, said frusto-conical member providing a seal between the filler pipe and filling duct by supporting the filler pipe on the top end of said filling duct, said member containing relief conduit means and a relief valve accommodating the passage of relatively large amounts of air from within the tank upon a pressure build-up within the tank.

References Cited in the file of this patent

UNITED STATES PATENTS

| | | |
|---|---|---|
| 2,212,620 | Scully | Aug. 27, 1940 |
| 2,522,207 | Bald | Sept. 12, 1950 |
| 2,746,415 | Campbell | May 22, 1956 |